United States Patent
Folk

(10) Patent No.: US 9,761,111 B2
(45) Date of Patent: Sep. 12, 2017

(54) ADAPTIVE BANDWIDTH CONSUMPTION IN REMOTE MONITORING OF AGRICULTURAL ASSETS

(71) Applicant: IntraGrain Technologies Inc., Regina (CA)

(72) Inventor: Kyle Ronald Folk, Regina (CA)

(73) Assignee: INTRAGRAIN TECHNOLOGIES INC., Regina, Saskatchewan (CA)

( * ) Notice: Subject to any disclaimer, the term of this patent is extended or adjusted under 35 U.S.C. 154(b) by 179 days.

(21) Appl. No.: 13/920,379

(22) Filed: Jun. 18, 2013

(65) Prior Publication Data

US 2014/0015689 A1    Jan. 16, 2014

(30) Foreign Application Priority Data

Jul. 16, 2012   (CA) .................................... 2783045
Aug. 13, 2012   (CA) .................................... 2785404

(51) Int. Cl.
| | | |
|---|---|---|
| G08B 21/18 | (2006.01) | |
| G08B 25/10 | (2006.01) | |
| H04L 29/08 | (2006.01) | |

(52) U.S. Cl.
CPC .......... *G08B 21/182* (2013.01); *G08B 25/10* (2013.01); *H04L 67/125* (2013.01)

(58) Field of Classification Search
CPC ...... G08B 21/182; G08B 25/10; H04L 67/125
USPC .................................................. 340/870.17
See application file for complete search history.

(56) References Cited

U.S. PATENT DOCUMENTS

| | | | |
|---|---|---|---|
| 4,293,854 A | | 10/1981 | Gookins et al. |
| 6,281,688 B1 * | | 8/2001 | Yankielun ...................... 324/643 |
| 6,810,263 B1 * | | 10/2004 | Cheng et al. ................. 455/510 |
| 6,983,164 B2 * | | 1/2006 | Kajimura ....................... 455/522 |
| 6,986,294 B2 * | | 1/2006 | Fromme et al. .............. 73/865.8 |
| 9,396,634 B2 * | | 7/2016 | Hicks, III ........ G08B 13/19697 |
| 2006/0250281 A1 * | | 11/2006 | Mahoney et al. ............. 340/988 |
| 2007/0078528 A1 * | | 4/2007 | Anke et al. ..................... 700/21 |
| 2007/0121566 A1 * | | 5/2007 | Chaudry et al. .............. 370/342 |
| 2007/0178929 A1 * | | 8/2007 | Kim .............................. 455/522 |
| 2007/0260400 A1 * | | 11/2007 | Morag et al. ..................... 702/1 |
| 2008/0106425 A1 * | | 5/2008 | Deaver et al. ................ 340/646 |
| 2010/0127881 A1 * | | 5/2010 | Schechter et al. ............ 340/584 |

(Continued)

*Primary Examiner* — Nay Tun
(74) *Attorney, Agent, or Firm* — Ryan W. Dupuis; Kyle R. Satterthwaite; Ade & Company Inc.

(57) ABSTRACT

Individual agricultural assets at a remote location are each equipped with at least one condition sensor in communication with a location-based controlling transceiver, which in turn communicates with a central monitoring system. The transceiver will monitor data received from the condition sensors and in accordance with predetermined notification parameters will send a signal to the central monitoring system only when a notification condition, for example an elevated temperature reading in the instance of a grain bin, is detected. By only communicating when a transmission bandwidth requirements between the transceiver and the central monitoring system are minimized. Further transmission bandwidth reduction can be achieved by limiting the notification condition parameters limiting transceiver packet. Various conditions including temperature, gas levels or presence, volume or other conditions of various types of assets could be monitored remotely in this way.

20 Claims, 8 Drawing Sheets

(56) References Cited

U.S. PATENT DOCUMENTS

2010/0135211 A1* 6/2010 Park et al. ................... 370/328
2010/0141449 A1* 6/2010 Twitchell, Jr. ............. 340/572.1
2010/0241277 A1* 9/2010 Humphrey ................... 700/282
2010/0271217 A1* 10/2010 Kates ........................... 340/604
2011/0241889 A1* 10/2011 Fromme et al. ............. 340/632

* cited by examiner

ADAPTIVE BANDWIDTH CONSUMPTION IN REMOTE MONITORING OF AGRICULTURAL ASSETS

This application and claims foreign priority benefits from Canadian Patent Application 2,783,045, filed Jul. 16, 2012 and from Canadian Patent Application 2,785,404, filed Aug. 13, 2012.

FIELD OF THE INVENTION

The present invention relates to the remote monitoring of a condition of an agricultural assets, for example the remote monitoring for elevated temperatures or other conditions which may cause spoilage of the organic material stored in bins, and more particularly the present invention relates to a monitoring system which communicates data in response to sensed conditions meeting prescribed notification criteria.

BACKGROUND

It is known to be desirable to monitor the condition of various assets in agricultural industries. In one example, when grains are stored in storage bins, it is particularly desirable to monitor the heating of the contents of those bins. Grain heating in storage bins can cause spoilage of the grain, resulting in diminished quality or full spoilage of the grain. Storage and high moisture or high heat environments can degrade or completely spoil these crops. Many efforts are made by farmers to minimize this possibility, and to maximize the price of their grain by enhancing and maintaining its top quality.

Storage bins are often located in close proximity to the fields where the crops are grown. In this way the grain can be stored until transport is required to a remote handling or dispatch facility, with minimum cost and time requirements during harvest.

One of the traditional approaches to monitoring grain bin temperature conditions has been to travel to each bin and manually inspect the condition of its contents. However where bins are geographically distributed, there are excessive costs and time commitments involved in traveling to each storage bin location. As well, given the distance and time involved in such travel, often the contents of the storage bin may not be checked as frequently as they should be to guarantee optimal storage of the product.

The use of remote monitoring solutions that employ in bin sensors is known. For example, U.S. Pat. No. 4,293,854 to Gookins et al teaches a system in which in-bin sensors communicate bin conditions to a remote display device. However, the systems that have been created in this area to date have a significant limitation in terms of their ongoing operating costs insofar as if they use hardwired communications infrastructure to communicate with the central monitoring station this introduces a significant limitation in the locations that can be used [since hardwired communications infrastructure such as a telephone line or the like is required at that location].

While prior art systems are known that employ wireless technology to transmit grain bin conditions derived from in-bin sensors, the cost of such systems particularly in more remote locations can be prohibitive. Prior art systems teach constant sensing of bin conditions, and constant or at least periodic transmission of such data to a remote monitoring location. The result is a requirement for a substantial amount of transmission bandwidth, which can be very costly for the individual farmer or a company providing bin monitoring services, which cost can increase significantly in the case of more remote bin locations.

Although grain bins have been described as one example of a remote monitoring system, the problems associated with substantial amount of transmission bandwidth required in monitoring systems exists in general in all fields, including those beyond agriculture.

What is needed, therefore, is a method and system for remote monitoring of the conditions of an asset to be monitored that reduces the amount of bandwidth required for sensor data transmission when an alarm condition exists, so that the user can take appropriate action to deal with the alarm condition.

The many conditions which could optimally be monitored remotely using a similar method, include volume stored within an asset storage vessel, presence of pests or gas associated with a product, or other types of conditions, all of which could also be incorporated into the desired method by simply adding or modifying the nature of the condition sensors associated with the asset, and it would again be desirable over the prior art to provide a reduced bandwidth data transmission method and equipment package that could monitor these types of conditions.

SUMMARY OF THE INVENTION

The present invention seeks to provide a method and system for remote monitoring of the conditions of an asset that reduces the amount of transmission bandwidth that would be required for central monitoring of asset condition sensors, for example grain storage bin condition sensors. By minimizing the amount of required transmission bandwidth, the economy of the system and method of the present invention is maximized.

According to one aspect of the present invention there is provided a monitoring system for remotely monitoring an agricultural asset at a remote location, the system comprising:

at least one condition sensor arranged to communication with the agricultural asset so as to sense a respective asset condition of the agricultural asset; and a controller configured to receive a signal from the at least one condition sensor indicating a sensed condition of the agricultural asset; the transceiver comprising a memory storage storing a prescribed notification criterion thereon associated with said at least one condition sensor thereon and a processor coupled to the memory storage to enable a comparison of the asset condition sensed by said at least one condition sensor to the prescribed notification criterion and determination of a notification condition if the asset condition meets the prescribed notification criterion;

the controller being configured to communicate a notification signal, through a communication network to a central monitoring system when the notification condition is determined.

According to a second aspect of the present invention there is provided a method for remotely monitoring an agricultural asset at a remote location, the method comprising:

a) providing a monitoring system comprising at least one condition sensor in communication with the agricultural asset so as to be arranged to sense a respective asset condition of the agricultural asset, a controller at the remote location which is arranged for communication with said at least one condition sensor and which includes a prescribed notification criterion associated with said at least one condition sensor stored thereon, and a central monitoring system located separately from the remote location and arranged for communication with the controller; and b) using the controller:
 i) periodically sampling the respective asset condition of the agricultural asset sensed by said at least one condition sensor;
 ii) comparing each sampled asset condition sensed by said at least one condition sensor to the prescribed notification criterion and determining a notification condition if the sampled asset condition meets the prescribed notification criterion; and
 iii) transmitting a notification signal to a central monitoring system in response to determination of a notification condition.

Preferably the controller comprises a transceiver arranged to transmit notification signals to the central monitoring system and receive instructions from the central monitoring system.

The controller may be used to receive an instruction signal from the central monitoring system and initiate an action in response to the instruction signal. For example, the controller may receive replacement notification criterion data from the central monitoring system and update the prescribed notification criterion stored on the controller using the replacement notification criterion data. In further instances, the instruction signal may correspond to a new prescribed cycle duration being assigned to each controller to replace the previous stored prescribed cycle duration in which the prescribed cycle duration corresponds to the duration between each periodic sampling of the condition of the asset of each sensor.

Alternatively, there may be provided a control mechanism in proximity to the agricultural asset which is operable to controllably vary a condition of the agricultural asset such that the method includes sending an instruction signal from the central monitoring station to the controller in response to a notification signal and using the controller to actuate the control mechanism in response to the instruction signal.

Preferably the sensed asset condition which met the prescribed notification criterion is transmitted together with the notification signal.

A plurality of agricultural assets may be monitored at a common remote location by providing each asset with a respective condition sensor and a respective controller arranged to communicate with the central monitoring station independently of the other controllers. Preferably an independent prescribed notification criterion is stored on the respective controller in association with each condition sensor. In this instance, preferably only sensed asset conditions which meet the prescribed notification criterion are transmitted together with the notification signal.

When the monitoring system comprises a plurality of condition sensors arranged to record respective asset conditions in different data formats, preferably the controller has a communication protocol arranged to communicate, with the different data formats of the a plurality of condition sensors such that the controller is adaptable to many different platforms.

Preferably a notification signal comprising a sensed asset condition of said at least one condition sensor is transmitted upon reaching a prescribed number of periodic samples of the asset condition sensed by said at least one condition sensor regardless of the prescribed notification criteria being met.

The central monitoring system is typically provided with a central memory for storing notification signals received by the central monitoring station in the central memory.

A web based user interface may further be provided which includes authentication protocols and which is arranged to permit users to communicate with respective data stored in the central memory.

The controller may also be provided with a communication protocol having a prescribed timeout duration corresponding to a duration that the controller attempts to communicate with the central monitoring system before the controller discontinues the communication attempt if no connection is made. In this instance, the prescribed timeout duration may be increased to an increased duration in response to a failed communication attempt. The prescribed timeout duration may then be maintained at the increased duration in subsequent communication attempts until a subsequent failed communication attempt requiring the duration to be increased again, until a maximum duration is reached.

When sensed asset conditions are communicated to the controller using a wireless signal having a prescribed signal strength, preferably the signal strength is incrementally increased until the sensed asset conditions are successfully communicated to the controller. The prescribed signal strength may then be maintained at an increased strength in subsequent communications. If another failed communication attempt occurs between a condition sensor and the controller, the signal strength may then again be increased.

According to a further aspect of the present invention there is provided a method for remotely monitoring internal temperature or other internal conditions of a storage bin, comprising the steps of: (a) providing at least one condition sensor in a storage bin for sensing an internal condition; (b) allowing the condition sensor to transmit the sensed internal condition of the bin or the material contained therein to a transceiver; (c) allowing the transceiver to compare the sensed internal condition to a set threshold level; and (d) if the sensed internal condition meets or exceeds the set threshold level, allowing the transceiver to transmit a signal to a central monitoring system as an alert that a reporting condition exists within the bin.

The method can be used with multiple bins and condition sensors, and the transceiver can receive data from all connected condition sensors. The connection between the condition sensors and the transceiver can be either wired or wireless. The transceiver, upon receiving a sensed internal condition reading that meets or exceeds the set threshold level, such as an internal temperature reading where the at least one condition sensor within a bin is at least one condition sensor, is preferably capable of generating a transmission packet that combines the sensed condition data and a location indicator for the particular sensor, such that any output could be limited to the particular condition sensor and enable both a reduced transmission bandwidth use and a more efficient on-site follow-up to address the adverse bin conditions. In preferred embodiments, the method comprises the further step of enabling access to the transmitted data, through data display at the central monitoring system, a warning signal indicating a high temperature level and/or data access at other locations.

According to yet another aspect of the present invention there is provided a system for remotely monitoring internal conditions of a storage bin such as temperature or the like, the system comprising: at least one condition sensor for provision in a bin, configured to sense an internal condition such as the temperature of particulate material stored within the bin; a transceiver configured to receive a signal from the at least one condition sensor indicating the sensed internal condition of the bin, such as temperature of material within the bin where the condition sensor is a temperature sensor; the transceiver comprising a memory storage for storing a set threshold level and a processor coupled to the memory storage to enable a comparison of the sensed internal condition of the bin and the set threshold level; and the transceiver configured to communicate the sensed internal condition of the bin, through a communication network to a central monitoring system when the sensed internal condition of the bin is determined to be at or above the set threshold level.

In some embodiments, the system includes multiple bins and condition sensors, and the processor is further capable, when the sensed internal condition of the bin, such as temperature of material within the bin where the condition sensor is a temperature sensor, is determined to be at or above the set threshold level of forming a transmission packet comprising the sensed internal condition and sensor location information. In preferred embodiments, the system also comprises means to enable access to the transmitted data through data display at the central monitoring system, a warning signal indicating a high temperature level and/or data access at other locations through the communication network.

Many different types of condition sensor configurations within the storage bins could be contemplated for use in accordance with the method and system of the present invention. For example, either the deployment of a single condition sensor for a particular type of a condition within the storage bin, or the deployment of multiple condition sensors at different locations within the storage bin to detect a particular storage condition, could be the case. More granular detection could be provided where multiple condition sensors were provided for a particular storage condition within a storage bin. In addition to the fact that one or more storage condition sensors could be used for a particular storage condition within a storage bin in accordance with the present invention, a particular storage bin can also be fitted with more than one condition sensor for the detection of more than one storage condition, for monitoring and reporting in accordance with the present invention. For example, temperature, air conditions or presence of particular gases are pests or the like within the contents of a storage bin could be monitored by sensors within the storage area of the bin and each such monitoring sensor level could be monitored by the system of the present invention in accordance with its own present threshold level.

There are also other storage conditions which could optimally be monitored remotely using a similar method, including volume stored within the bin, presence of pests or gas, or other types of conditions, all of which could also be incorporated into the desired method by simply adding or modifying the nature of the condition sensors within the bin, and it would again be desirable over the prior art to provide a reduced bandwidth data transmission method and equipment package that could monitor these types of conditions.

Various embodiments of the invention will now be described in conjunction with the accompanying drawings in which:

BRIEF DESCRIPTION OF THE DRAWINGS

In the accompanying drawings, which illustrate exemplary embodiments of the present invention.

Figure 1:
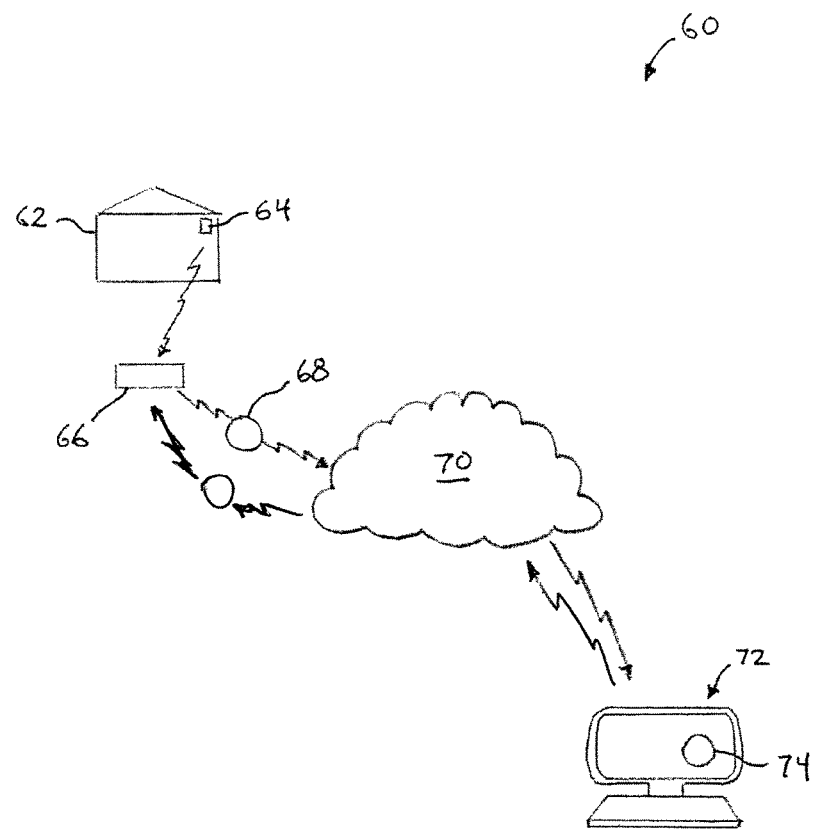
FIG. 1 is a diagrammatic illustration of a first system in accordance with the present invention.

Exemplary embodiments of the present invention will now be described with reference to the accompanying drawings.

In the drawings like characters of reference indicate corresponding parts in the different figures.

DETAILED DESCRIPTION

Referring now to the accompanying drawings, embodiments of a method and system according to the present invention are illustrated.

Overview

As outlined above, the general concept of the present invention is to provide a method, and related apparatus, for remote condition monitoring of various conditions of one or more assets which can be centrally monitored. The method and apparatus described herein optimize the amount of communications bandwidth required so that the remote sites can connect to the central monitoring location wirelessly, at a reasonable economic cost.

One of the primary conditions of the asset which it is contemplated could be monitored in accordance with the present invention is the temperature of the organic particulate material stored within a storage bin, although it is specifically contemplated that multiple other conditions of other types of assets might be desirable to be monitored and/or reported in accordance with the system and method of the present invention as well.

At each remote monitoring location, one or more assets is each fitted with at least one condition sensor for the purpose of monitoring and reporting a condition associated with that asset. For example, where the at least one condition sensor within a grain bin is a temperature sensor, the storage condition which could be monitored and reported in accordance with the remainder of the method herein would be the temperature of the organic particulate material stored within that bin.

These condition sensors are each connected to a transceiver capable of receiving condition readings from the grain bin condition sensors, and upon detection of a notification condition communicating with a central monitoring station. The transceiver will basically monitor periodic condition readings from the individual sensors, and upon detection of a change or a condition which might constitute a threat to the asset [being the preprogrammed notification condition or notification parameters] triggering a communication to the central monitoring station from the transceiver, identifying the asset and related condition details.

The central monitoring station could in turn notify a user or third party upon receipt of such notification.

The method of the present invention would be implemented by a system comprising several components. These components would include, at each remote monitoring location which was desired to be equipped or monitored in accordance with the method of the present invention, at least one condition sensor associated with each asset which was desired to be monitored. The condition sensors would in turn be operatively connected to a transceiver located at the remote monitoring location, which was capable of monitoring the conditions in the storage bins via the interface with the condition sensors. In addition to a communication bus which would enable communication with the condition sensors associated with individual assets, the transceiver would also be equipped to communicate with a central monitoring system and central monitoring location, such that when the transceiver detected a trigger event in terms of a condition an asset connected thereto, it could dispatch a notification to the central monitoring system for subsequent handling.

The central monitoring system at the central monitoring location would be capable of receiving notifications from one or more transceivers each located at remote monitoring locations and operatively connected to one or more assets. The central monitoring system would then also be capable of dispatching outgoing communication to users when a trigger event was detected and/or a notification was require the central monitoring system is contemplated to incorporate a website user interface, although other types of user interaction can be contemplated, and the user and location database would likely also be required in the context of the central monitoring system to store the necessary information to properly receive and process notifications and to provide whatever reporting was desired or programmed within the system. The following provides some additional detail with respect to each of the system components.

Condition Sensors:

Various types of sensors are contemplated for association with many different types of assets such as treated seeds, grains, oilseeds, pulses, fertilizer including dry and liquid, fuel, oil, chemicals, equipment, residences, outbuildings, livestock, dairy, poultry, hogs and others. Accordingly, the sensors can be arranged to sense various conditions according to the assets being monitored such as carbon dioxide, humidity, moisture, pressure, level, temperature, imaging, insect detection, pest detection, theft detection, kernel size, GPS, protein quality, weather and others.

For simplicity however the primary examples described herein relate to the storage of agricultural products, for example grain bins and the like. Many types of condition sensors which are capable of detecting the condition of the environment or material stored within a storage bin have been used in past storage monitoring applications. Most specifically, where the environmental condition which is desired to be monitored is the temperature of organic particulate material stored within the bin, such as green or the like, various types of grain bin temperature monitoring sensors have been used in the past.

Other types of environmental conditions may also be desired to be monitored within an organic particulate material storage bins at a remote location. For example it may be desirable to detect the presence of carbon dioxide or other gases within the material stored within the BNR within the bin environment, as an indicator of the presence of tests or particular spoilage conditions within the internal environment of the storage bin. The method and apparatus of the present invention could be used in this type of an application also simply by changing or adding to the number of condition sensors within the storage bin to include at least one condition sensor within a relevant storage bin that could detect the presence of the carbon dioxide or other gas which was desired to be detected. Similarly, humidity within the storage bin environment could also be monitored using a humidity condition sensor.

It will be understood by those skilled in the art that many different types of conditions associated with a remotely located asset could impact the quality or value of the asset being monitored and that any kind of a sensor for association with the asset, for example the placement within the grain storage bin, which would allow for the monitoring and/or detection of changes in those conditions are contemplated within the present invention.

It is contemplated that these pre-existing types of condition sensors could be used, or a purpose built sensor could be used the key for the condition sensors of the present invention would be that they were capable of connection and communication with the transceiver. In fact it is desired to provide a transceiver and the remainder of the present system an invention in a way that it could be interchangeably used with preexisting grain bin condition sensors this would simply require that the transceiver be capable of the proper communications protocol to read those prior art sensors and perhaps also the provision of adapters or a communications interface which was physically capable of connection to those pre-existing temperature connectors and sensors within the bins.

The condition sensors would be located within each storage bin that was desired to be monitored at the remote monitoring location. In all embodiments, the condition sensors could be connected either wirelessly or in a hardwired fashion to the transceiver.

Some grain bin condition sensors have been developed in the past which actually allow for the detection of temperature within individual zones within the bin, and it will be understood that the necessary modifications to the programming on the transceiver in the central monitoring system could be made to allow for the use of those types of grain bin condition sensors and to allow for the reporting and notification based upon temperatures within particular zones of a storage bin rather than using only a single temperature detection zone within a single bin. Both such approaches are contemplated within the scope hereof.

Beyond the fact that it will be clear from the narrative so far in this document that it is intended to specifically monitor potentially temperature within a grain storage bin by the deployment of at least one temperature sensor, being at least one condition sensor, within the storage bin, it will also be understood that more than one condition sensor for a particular environmental condition could also be used to increase the level of accuracy or granularity in the readings which could be obtained and reported in accordance with the remainder of the method hereof. For example the incorporation of multiple condition sensors for a single condition at different locations within the storage bin would allow for the reporting of condition readings in those zones. Incorporation for example of multiple temperature sensors within the bin could allow for the monitoring and reporting of heating or temperature or other condition change in individual zones within the bin and could allow the us for simpler remote troubleshooting and/or monitoring. Incorporation of more than one condition sensor for a particular condition within a storage bin will thus be understood to be within the scope of the present invention.

It may be desirable to detect and/or monitor multiple environmental conditions within a storage bin, which could be done with more than one condition sensor placed therein. For example if it was desired within the scope of the present invention to monitor temperature and humidity, condition sensors which could read temperature, as well as condition sensors which could reach humidity, or even a combined sensor which could take both readings, could be used within the remainder of the method of the present invention as well, and then to conditions in that circumstance, being internal temperature as well as internal humidity readings, could be monitored for their compliance with the programmed notification parameters and potential reporting to the central monitoring location in accordance with the remainder of the adaptive communication method outlined herein. The deployment of multiple condition sensors within the storage bin, for the detection and monitoring of multiple conditions within that bin, will thus also be understood to be within the scope of the present invention.

The type of conditions which could be monitored for reporting within the nature and method of the present invention are many. Really any type of condition which can be monitored by a sensor could be monitored using the method of remote monitoring and communication outlined herein. It is specifically contemplated that the conditions which could be monitored in accordance with the method of the present invention when applied specifically to the monitoring of stored agricultural products include the temperature of material stored within the storage bin, humidity, presence of gases within the storage material or the storage area of the bin, such as carbon dioxide or the like, presence of pests or otherwise. The specific condition sensors themselves could take many forms as it will be understood by those skilled in the art that the key role of the condition sensors in the method of the present invention is simply to provide the necessary condition readings from the material or the storage area of a storage bin, for monitoring in accordance with the remainder hereof.

Where multiple condition sensors for a particular condition or conditions are deployed within a bin this could be done in many different physical ways which would not depart from the scope or effectiveness of the present invention.

Transceiver:

The transceiver of the present invention would be the remote site hardware that was responsible for aggregation and monitoring of the condition levels within the various storage bins at that location, for the purpose of detection of trigger events and otherwise potentially subsequently providing notification to the central monitoring system. The transceiver would be any combination of hardware and software capable of connection and communication with the grain bin condition sensors in use at that location, monitoring and detection based upon the condition levels within the storage bins and then at appropriate times initiating communication from the transceiver to the central monitoring system via a communications interface as well.

The specific hardware configuration of the transceiver of the present invention could take many formats, so long as the transceiver was capable of communication with and monitoring of the grain bin condition sensors at the remote location, and outgoing communication between the transceiver and the central monitoring system. The hardware and software of the transceiver would also have programmed or flashable therein, the precise software or parameters required for monitoring and detection of a particular trigger event in terms of a temperature or other condition change in a grain bin connected thereto, which would occasion the triggering of the notification and the remainder of the method of the present invention.

The transceiver would include at least one condition sensor interface capable of connection to at least one condition sensor associated with an asset being monitored. It is specifically contemplated that either hardwired or wireless condition sensors could be used and on that basis it may be necessary for the transceiver to include multiple sensor interfaces, to read those sensors as required—incorporation of multiple sensor interfaces into a transceiver in accordance with the remainder of the present invention would be understandable to those skilled in the art of circuit and electronics design in this field and all such modifications or enhancements are contemplated within the scope hereof.

As outlined above, it is particularly contemplated that the grain bin condition sensors could either be connected to the transceiver on a wireless basis or alternatively in a hardwired fashion or a combination thereof with respect to a single transceiver. While perhaps the simplest implementation or installation of a new system according to the present invention would be the use of wireless grain bin condition sensors which would wirelessly handshake and communicate with a transceiver at the location, the incorporation of a hardwired interface would be particularly useful to allow for the operability of the transceiver and the remainder of the method of the present invention with previously installed hardwired grain bin condition sensors.

In addition to the at least one condition sensor interface, the transceiver or the present invention would also include at least one external network interface. The external network interface would be any combination of circuitry and software operatively integrated with the remainder of the transceiver which was capable of sending and/or receiving communications from a central monitoring station in accordance with the remainder of the present invention.

The communications interface from the transceiver to the central monitoring system would need to at least be one way communication such that communication could be initiated from the transceiver to the central monitoring system. It may also be desired to have the ability for two-way communication such that the central monitoring system could as required query the transceiver for more detailed condition data from the site, flash the firmware on the transceiver as may be required, or otherwise download from the central monitoring system to the transceiver necessary location parameters and detection data etc.

It is most specifically contemplated that the transceiver would communicate wirelessly with the central monitoring system, and it is the wireless communication between the transceiver and the central monitoring system which is desired to be optimized at the heart of the present invention. It is specifically contemplated that the transceiver would incorporate a cellular modem which was capable of communication via a wireless IP network—which was capable then of sending and/or in a two-way communications embodiment receiving IP communications to and from the central monitoring station for that transceiver. Various other types of communication interfaces and protocols between the transceiver and the central monitoring system might be understood to those skilled in the art which would not depart from the scope and intention of the present invention and insofar as those are available those are also contemplated within the scope hereof.

In certain embodiments it may be desired to provide multiple external network interfaces for an added level of redundancy. Incorporation of multiple external network interfaces for communication with the central monitoring station of the present invention, and the necessary modifications to the remainder of the transceiver software or hardware, will also be understood by those skilled in the art and are contemplated within the scope hereof.

Dependent upon the number of channels which the transceiver was capable of monitoring it may be the case that more than one transceiver was required in a particular remote monitoring location.

Central Monitoring System:

The system and method of the present invention relates to or relies upon communication of temperature or other condition change in remotely located storage bins when an appropriate temperature or other condition change is detected, to a central monitoring system. The central monitoring system would then be programmed with further parameters as to how to action the receipt of a particular condition change notification from a remote monitoring site—a user or third party for example could be notified by way of a text message, e-mail, telephone message or otherwise.

The central monitoring system of the present invention could take many specific forms but would generally speaking comprise a hardware and software combination which was capable of receiving communication packets from transceivers located at remote monitoring sites, as well as capable of dispatching communications to users or third parties to provide notifications of temperature or other condition changes at the appropriate time. In terms of communications infrastructure the central monitoring system would require the necessary hardware and software combination to receive notification messages from the remote transceivers at the remote monitoring sites—which could be an IP network interface, but dependent upon the type of modems or other communication hardware used on the transceivers could also comprise any number of other different communication interfaces all of which will be obvious to those skilled in the art and are contemplated within the scope of the present invention.

The second communications interface required by the central monitoring station would be the ability and interface to communicate on an outgoing basis with users on notifications of temperature or other condition changes, when notification of a trigger event was received by the central monitoring system from a transceiver operatively connected therewith. The central monitoring system might actually include more than one outgoing communications interface if it was desired to provide maximized flexibility to users thereof—for example the system might be capable of dispatching notification messages by SMS text message and or by e-mail message and the necessary hardware and software combination to work in conjunction with the remainder of the infrastructure of the central monitoring system to provide these outgoing communications abilities will be understood by those skilled in the art and again are all obviously contemplated within the scope of the present invention.

Dependent upon the type of notifications which it was desired to provide upon the detection of a reportable condition change in a storage bin, both the incoming and outgoing communications networks used by the central monitoring location and system might be one the same as well, rather than the use of multiple communications methods by the central monitoring system for the dispatch of notifications and the receipt of data packets from remote monitoring locations. Both such approaches will be understood to be within the scope of the present invention.

User interface and interaction with the central monitoring system, either for the sake of setting customized user level notification parameters or otherwise receiving reporting or other information could be done in many ways. It is specifically contemplated that the central monitoring system of the present invention would comprise or include a website system which would allow the user to configure various notification parameters or conditions at the user level that were enabled to be done on this basis as well as to potentially capture and/or provide reporting to the user upon detection of a trigger event or otherwise.

Programming of a database interface through a website or otherwise which would allow for the entry or configuration of user level notification parameters in the remainder of the system of the present invention, as well as providing reporting of various types, will all be understood by those skilled in the art of website design and all necessary adjustments or inclusions to the central monitoring system of the present invention to accomplish these objectives are contemplated within the scope of the present invention.

User and Location Database:

The central monitoring system could include a user and location database, in any particular data structure or format which was capable of being read, written and interfaced with by the central monitoring system of the present invention. The key aspects of that database would be to maintain the necessary information to generate notifications on behalf of the user if a particular bin sensor and transceiver detected a trigger event occasioning a notification to the user about a temperature or other condition change in that bin. Other data related to the user or the various remote bins and locations of the user could also be stored within such a database to allow for more elaborate or customized reporting.

Finally and as outlined elsewhere above, if the system was configured such that it was desired to allow the user to specify the notification parameters or the detection parameters around trigger events either for individual bins or at their own "user account" level, the database of the central monitoring system could include the necessary structure or components for the user to indicate and store these settings with relation to their user account. In a case such as this where the user was allowed to adjust the notification or detection parameters, it would also be desirable for the central monitoring system of the present invention to be able to send communication to the transceivers at specific remote locations, in addition to receiving trigger notifications therefrom, since adjustments to the detection parameters would likely in an optimized fashion be communicated to and hosted on the transceiver so as to maintain and maximize the optimization of bandwidth consumption in the dispatch of trigger notifications from the transceiver(s) All of these requirements would be understood and met by those skilled in the art of database design and any data structure or database which would store this type of information in a fashion that it was communicably accessible to the remainder of the central monitoring system of the present invention are contemplated within the scope hereof.

Trigger Event and Notification Parameters:

As outlined the general concept of the method of the present invention is to provide a notification of a condition change, for example temperature within a storage bin for grain or other organic particulate material when a temperature or other condition change of a magnitude to indicate a spoilage issue in the bin or other deterioration or devaluation of an asset in general is detected. The requisite temperature or condition delta which would constitute a notification condition and fire a trigger event, so to speak, resulting in a notification from the remote site transceiver to the central monitoring station, could either be hardcoded into the system and the transceiver as a whole, or on a user by user or remote site by remote site basis this notification parameter could be programmed by the user or for the user. Either approach, namely that of a hardcoded temperature or condition delta which would occasion a notification, or a user adjustable set of user notification parameters is contemplated within the scope of the present invention. Implementation of either approach would be possible for those skilled in the art and as such any general modifications required to the overarching system or protocol of the present invention to accommodate these different notification approaches are all contemplated within the scope thereof as well. The threshold level at which a trigger event would be sensor detected is the primary parameter which would need to be programmed or maintained, accessible to the transceiver, with respect to each bin.

The threshold level for a particular monitored condition could vary between storage bins based upon the contents thereof. It is specifically contemplated that the transceiver could be programmed either with the same threshold level for each grain bin condition sensor which was being monitored, or the threshold level or other notification parameters including the trigger temperature and/or the necessary delta which would occasion a notification could be adjusted on a bin by bin or sensor by sensor basis and both such approaches are contemplated within the scope of the present invention.

The threshold level which could be used for detection of a trigger event, could either be a present condition level, or dependent upon the nature of the programming, without departing from the scope and intention hereof, might also be set as a certain change in condition over time—such that the trigger event might be detecting that the condition associated with the asset had reached a particular level, or alternatively the threshold level determination and detection of a trigger event rather than detecting reaching a certain fixed condition level could be to seek to detect a particular rate of condition change associated with the asset. Both such approaches are contemplated within the scope of the present invention.

While operationally the key parameter which needs to be maintained on the memory store of the transceiver for the purpose of operation of the detection portion of the method of the present invention is the threshold level with respect to each condition monitored with each bin or by each condition sensor, it is also necessary to maintain notification parameters within the system such that when a trigger event is detected with respect to a certain bin at a certain site or location, a notification can be dispatched to the relevant parties. For example an e-mail address, and SMS text number or the like, might be the necessary parameters which needed to be stored, likely in the user database upon the central monitoring system rather than at the transceiver level, and which would need to be used by the system at the central monitoring station to dispatch the appropriate notifications of the existence of a trigger event at a particular storage bin at a particular storage site.

These notification parameters might vary by asset, by transceiver or by user, and these varying levels of flexibility in the notification process are all contemplated within the scope of the present invention as well. It is specifically contemplated that where the central monitoring system incorporates a website or other related user interface for reporting purposes, that website system might also allow the user to access and program the threshold level settings for particular assets, condition sensors and transceivers within their implementation of the method as well as the notification parameters associated either at the user level with their account or down to more specific transceivers, sites or assets. Where a website system or similar user interface was used to allow the user to customize their settings for the hardware of the present system, and the user entered alternate threshold data with respect to particular assets on particular transceivers associated with their user account on the system, the central monitoring system could in a two-way communication environment, flash those threshold level changes back to the necessary transceivers for storage and use thereon.

Figure 2:
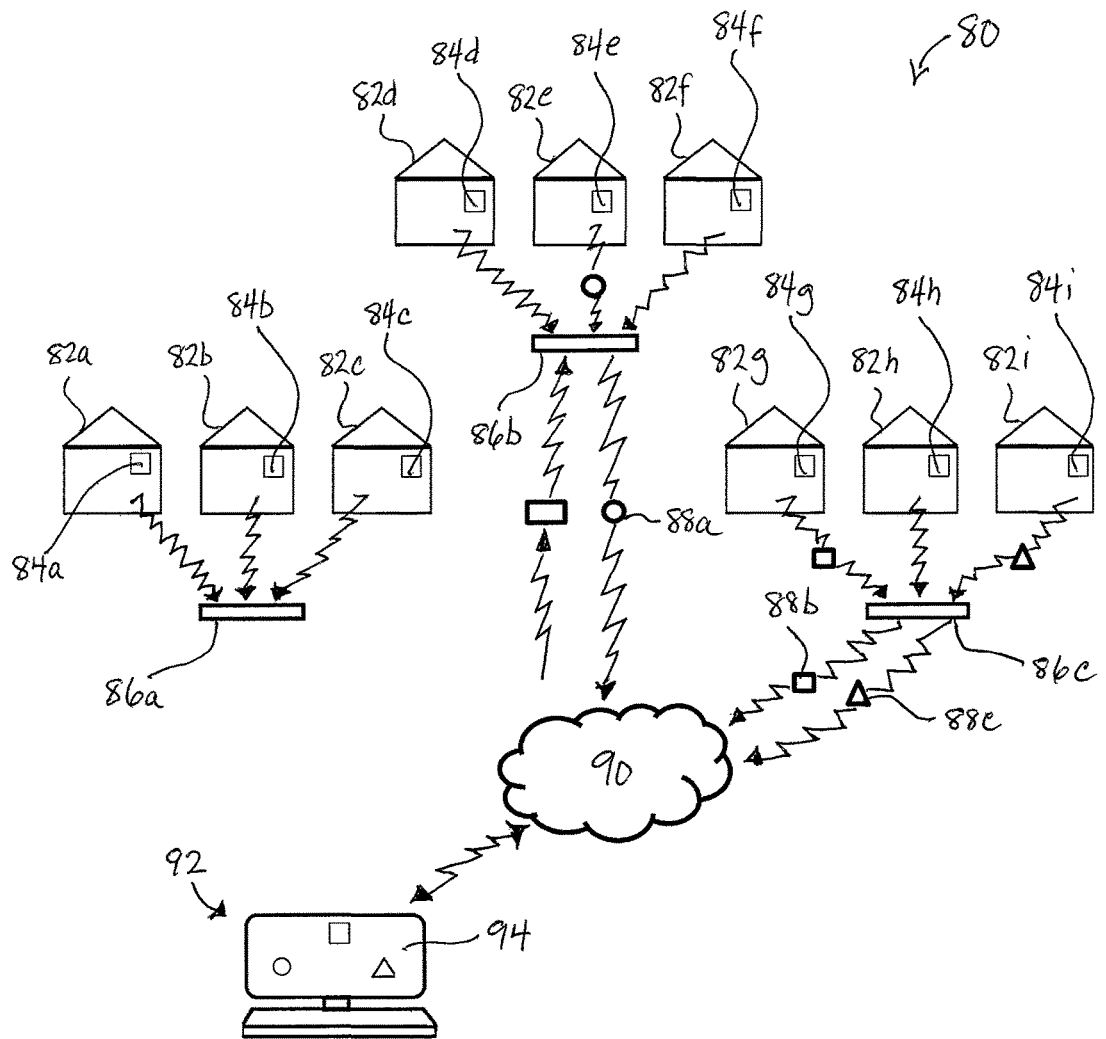
FIG. 2 is a diagrammatic illustration of a second system in accordance with the present invention.

Operation of the System:

Turning to FIGS. 1 and 2, two initial exemplary embodiments of systems according to the present invention are illustrated.

In FIG. 1, a system 60 is illustrated in which the asset being monitored is a single grain storage bin 62. The bin 62 is provided with a condition sensor 64 for detecting the temperature within the bin 62. In this particular illustrated embodiment the condition which is intended to be monitored by the condition sensor 64 is the temperature within the bin 62 but as outlined elsewhere herein other conditions could also be monitored either in the place of or in addition to temperature.

Various temperature condition sensors that can serve this function are commercially available, and one skilled in the art would be able to identify numerous appropriate products. One of the types of temperature condition sensors 64 which it is known are available in the marketplace and which it would be desirable to integrate with the remainder of the system of the present invention is a temperature sensor cable, which incorporates a plurality of condition sensors 64 along its length such that when it is placed within the storage bin vertically, it allows for the reading of temperature of material stored within the bin at multiple vertical heights between the floor and ceiling of the bin. As outlined elsewhere herein, the use of more than one condition sensor 64 to monitor a condition such as temperature on the zone basis rather than a single sensor within the entire bin, is also contemplated within the scope of the present invention.

The system 60 further comprises a transceiver 66 that is configured to receive a signal from the at least one condition sensor 64 indicating the internal temperature or other condition of a bin 62 either by wired or wireless communication between the sensor and the transceiver. The transceiver 66 is further configured to communicate in a wired or wireless fashion with a communication network 70 such as the Internet through, for example, a cellular modem, and in turn via the communications networks 70 with a central monitoring station or system 72.

The transceiver 66 is provided with both a memory storage and a processor. The memory storage will contain notification parameters, being a customized threshold temperature or other condition detection level, in respect of each condition sensor 64 connected thereto, for access by the processor. The processor is coupled to the memory storage in a manner known to those skilled in the art, and the processor compares the sensed temperature data against the threshold temperature detection level for that bin saved in the memory storage. If the sensed temperature or other condition is at or above the threshold level a trigger event then the processor causes the transceiver to send a transmission packet 68 through the communication network 70 to the central monitoring system 72. This discrete transmission packet 68, as described in detail above, is indicated by the circle symbol on the transmission line. Upon receipt of the transmission packet 68 by the central monitoring system 72, a notification to relevant parties such as the owner of the storage bin etc. can be triggered by email, text message or the like.

Although not shown, the system 60 can also include a means for enabling third party access to the received data once it has been sent to the central monitoring system 72. For example the central monitoring system 72 as outlined elsewhere herein might include a website system or other similar user interface, whereby a user or another third party could access the data through the communication network 70 with the use of a password or other security mechanism.

Referring now in detail to FIG. 2, an exemplary system 80 is illustrated that incorporates a plurality of bins 82 and condition sensors 84. Each of the bins 82 is illustrated with a matched sensor 84, e.g. bin 82a and sensor 84a, bin 82b and sensor 84b, etc. As indicated above, various condition sensors that can serve this function are commercially available, and one skilled in the art would be able to identify numerous appropriate products and their application without undue effort. The use of either single or multiple condition sensors 84 for the detection and monitoring of a particular environmental condition within the storage bin is explicitly contemplated herein, as is the use of either single or multiple condition sensors 84 to monitor more than one environmental condition within the storage bin—such as temperature, humidity, carbon dioxide or other gas presence, pests, storage volume or the like.

The system 80 further comprises a transceiver 86 for each grouping of bins 82 and condition sensors 84. The transceiver 86a is configured to receive signals from the condition sensors 84a, 84b and 84c with respect to internal temperature conditions in the bins 82a, 82b and 82c, respectively. The transceiver 86b is configured to receive signals from the condition sensors 84d, 84e and 84f with respect to internal temperature conditions in the bins 82d, 82e and 82f, respectively. The transceiver 86c is configured to receive signals from the condition sensors 84g, 84h and 84i with respect to internal temperature conditions in the bins 82g, 82h and 82i, respectively.

It is known in the art to use wired or wireless communication means between condition sensors and the receiving device, and either wired or wireless communication means are appropriate with the exemplary system 80. The transceivers 86a, 86b and 86c are further configured to communicate in a wired or wireless fashion with a communication network 90 such as the Internet through, for example, a cellular modem.

Each of the transceivers 86 is provided with both a memory storage and a processor. A customized threshold level (as discussed above) is saved in the memory storage for access by the processor. The processor is coupled to the memory storage in a manner known to those skilled in the art, and the processor compares the sensed condition data against the threshold level saved in the memory storage.

The processor is further capable, when the sensed internal condition of the bin, such as temperature of material within the bin where the condition sensor is a temperature sensor is determined to be at or above the set threshold level, of forming a transmission packet comprising the sensed internal condition of the bin, such as temperature of material within the bin where the condition sensor is a temperature sensor and sensor location information.

Figure 3:
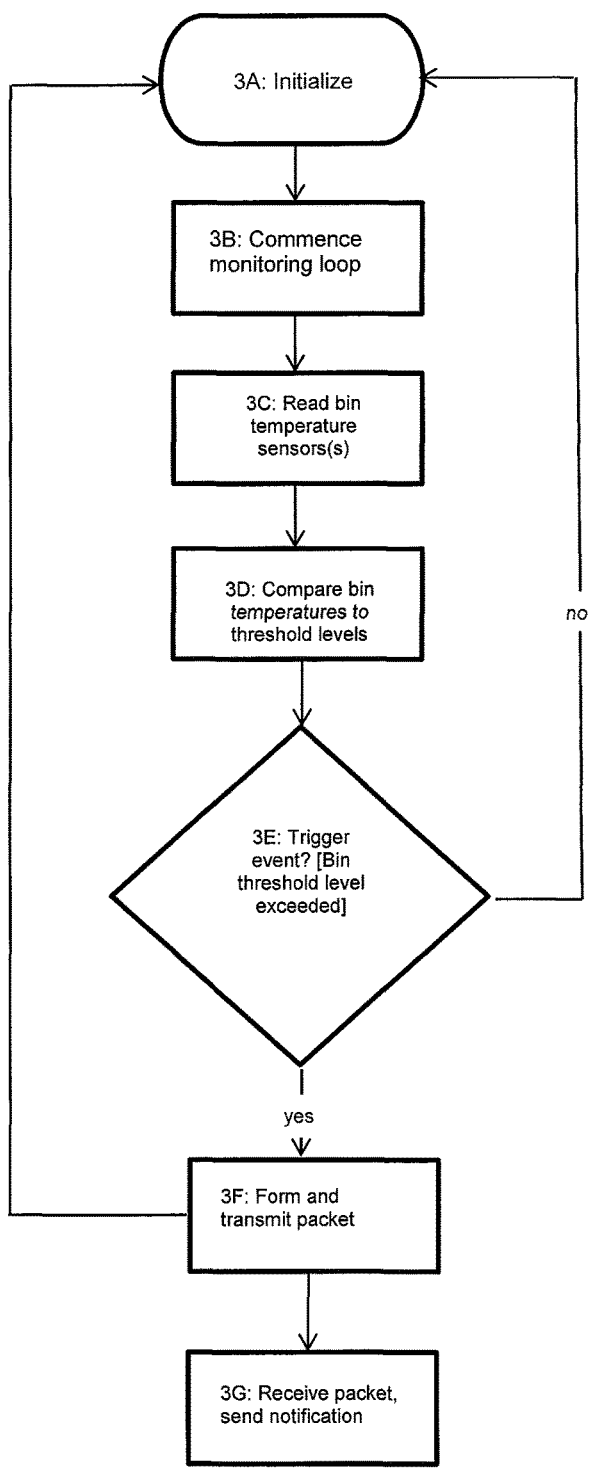
FIG. 3 is a flowchart illustrating a first exemplary method in accordance with the present invention.
Figure 4:
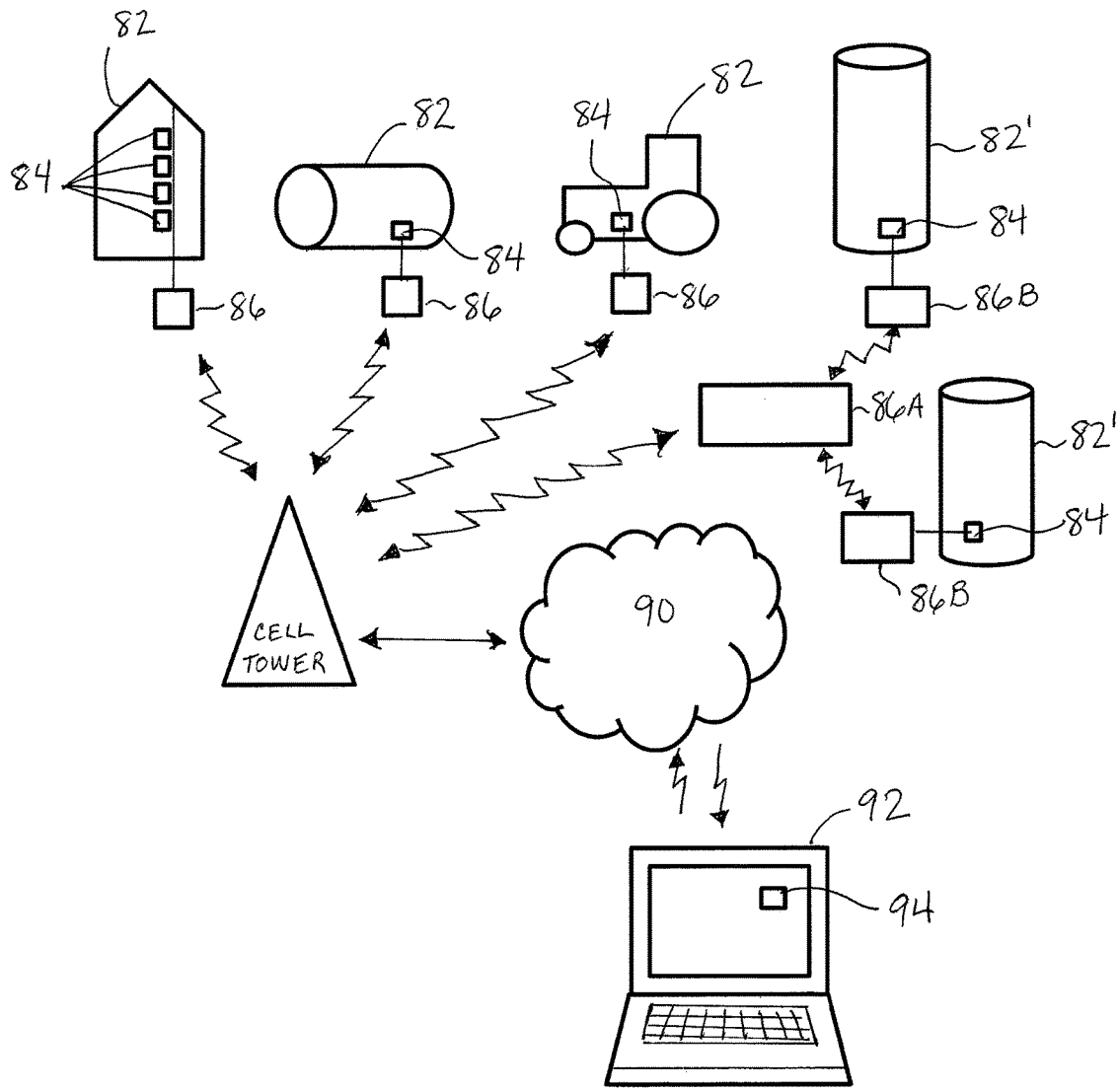
FIG. 4 is a diagrammatic illustration of a third system in accordance with the present invention.

If the sensed temperature or other condition monitored by a condition sensor is at or above the threshold level—a trigger event—then the processor causes the transceiver 86 to send a transmission packet 88 through the communication network 90 to the central monitoring system 92, in the same manner as described with regard to the embodiment of FIG. 3. As can be seen in FIG. 4, not every condition sensor 84 detects an elevated internal bin temperature, and accordingly the number of transmission packets 88 is reduced. In the illustrated embodiment, of the nine bins being monitored, only the bins 82e, 82g and 82i manifest elevated internal temperatures, which temperatures are sensed by the condition sensors 84e, 84g and 84i, respectively. Whereas the transceiver 86a receives no signal requiring the formation and transmission of a transmission packet, the transceiver 86b receives one elevated temperature indication (indicated by a circle symbol) and the transceiver 86c receives two elevated temperature indications (indicated by the square and triangle symbols). The transceiver 86b accordingly transmits a transmission packet 88a through the communication network 90 to the central monitoring system 92, and the transceiver 86c transmits transmission packets 88b and 88c through the communication network 90 to the central monitoring system 92. While separate transmission packets 88b and 88c are sent, it may be desirable and more cost-effective to transmit both packets together in a single transmission. In this instance, the controller performs a single sample cycle according to FIG. 5 by sampling all of the condition sensors, followed by (i) comparing each sampled asset condition sensed by each condition sensor to at least one of the previously sensed conditions to determine if the threshold level of the prescribed notification criteria has been met for that condition sensor and (ii) determining a notification condition for that condition sensor if the sampled asset condition meets the threshold level of the prescribed notification criteria. Accordingly, for each sampling cycle, the controller initiates transmitting a single notification signal to the central monitoring system in response to determination of the notification condition by any one of the condition sensors in which the notification signal includes an identification of each sensed condition which resulted in determination of the notification condition for the respective condition sensor as described and illustrated further herein. At the central monitoring system 92, indications 94 of the trigger events are captured and notified as programmed (shown as circle, square and triangle symbols). In this way, sensor activity on nine bins only requires bandwidth use for three (or possibly two) transmissions to the central monitoring system.

Method

Having now outlined the transceiver hardware of the present invention as well as the system of the present invention which includes at least one transceiver connectable to at least one condition sensor in a storage bin, and at least one central monitoring system in communication therewith, it is now desired to in some detail discuss the actual monitoring method of the present invention.

FIG. 3 demonstrates a first embodiment of the method of the present invention which is directed towards use for monitoring conditions of a grain storage bin as an example. In this method, at least one storage bin is provided for the storage of grain or other organic material and is fitted with at least one condition sensor configured to communicate with the transceiver in accordance with the present invention. The transceiver is adapted to be connectable to at least one condition sensor fitted to a storage bin, and has an external network interface allowing them to communicate at the appropriate time with a central monitoring system.

Although much of the within description specifically discusses temperature condition sensors due to the impact of elevated temperatures in grain spoilage, it will be obvious to those skilled in the art that other types of sensors for other types of environmental readings could also be employed with the present invention and such are intended to be included within the scope of the present invention. These include humidity, gas detection such as carbon dioxide or the like, presence of pests, or other conditions for which sensors would be available or could be created.

The flow chart of FIG. 3 demonstrates a first embodiment of the method of the present invention. Shown at step 3A is the initialization of the bin condition sensor and transceiver system. What is contemplated in this particular embodiment is the periodic monitoring of the condition readings in the storage bins, by periodically polling the condition sensors in the bins from the transceiver. Each period polling occurs at the expiry of a prescribed cycle duration from the end of the previous periodic polling event. The prescribed cycle duration is stored on the memory storage of the transceiver, also referred to herein as the controller, and can be varied according to user preference. In one example, the reporting may be anywhere within the range of nearly continuous reporting, to reporting approximately hourly, be minimized to as little as once a day, or any other suitable duration. In either instance, the prescribed cycle duration can be set by a user, for example through a user interface of the central monitoring station, to be updated on the controllers by data transfer from the central monitoring system upon subsequent communication between the controller and the central monitoring system.

A periodic monitoring loop for a polling frequency is shown at 3B. At Step 3C, the transceiver would poll or read the value of the at least one condition sensor operatively connected thereto, and compare the reading from the at least one condition sensor to the threshold values stored within the memory of the transceiver with respect to that particular bins sensor or sensors. The threshold comparison of the acquired temperature values is shown at 3D.

If a temperature or condition delta or reading exceeding the threshold value with respect to its particular related condition sensor (s) was not detected, the detection decision step being shown in the flow chart at 3E, the method would loop back to the commencement of another periodic polling interval. Alternatively, if the readings acquired from one or more of the attached bin condition sensors exceeded the respective threshold values therefore stored within the memory of the transceiver, this would constitute the detection of a trigger event. If a trigger event was detected, the transceiver would form and transmit a transmission packet containing the condition sensor temperature data and also data identifying the particular sensor and its location, via the external network interface of the transceiver, to the central monitoring system, shown at 3F, the transmission packet only includes information on the sensed temperature level and the condition sensor identifier I location and hence is of relatively modest size.

The central monitoring system, upon receipt of a transmission packet from a transceiver, would parse that packet to determine the appropriate user notification parameters from the user database or other information stored or accessible thereto, and the necessary notifications to the users would be dispatched (3G) In the method of FIG. 3, while there is a periodic monitoring frequency assigned, within which the transceiver would poll or otherwise read the values from the various condition sensors associated their with, it can be seen that a data transmission from the transceiver to the central monitoring system would only take place if a trigger event, meaning in these particular embodiments an unacceptable temperature or condition delta in a storage bin, was detected.

By limiting the transmission from the transceiver to the central monitoring system to the discrete transmission packet only upon detection of a notification condition, transmission bandwidth use is reduced and the cost is accordingly reduced. Also, the discrete transmission packet includes an identification of the condition sensor and its location, which enables a more efficient on-site follow-up to address the adverse bin conditions. In addition, a user can disable the monitoring once a trigger event has occurred and only reinitiate monitoring once the issue has been corrected on-site, to further reduce transmission costs.

The remote condition monitoring method demonstrated in FIG. 3 can also be further modified if ongoing basic condition reporting is required from the remote monitoring site by combining the trigger event monitoring method of the present invention with the occasional periodic transmissions from the transceiver of a complete set of condition readings from the condition sensors connected thereto. For example while the system might be primarily used to detect unsafe heating conditions where the condition sensors were temperature sensors, it might also be desirable to periodically capture a complete set of temperature readings from the bins at a remote location.

It may be desirable for an ongoing reporting or monitoring method to occasionally poll or report the condition readings from all of the bins operatively connected to the transceivers at a particular remote monitoring site, but given the incorporation of occasional periodic reporting with the exception detection method of the remainder of the present invention, the periodic time frame for acquiring all of the temperatures of all of the bins connected at the remote monitoring site can be significantly reduced for example rather than needing to poll the condition sensors within all of the bins for monitoring purposes and transmit all of that information to the central monitoring system each time it is polled, for example every hour, with transmissions of exception or trigger event packets to the central monitoring system only when required, and then for example it may be the case that the transceiver of the present invention was programmed to still send a complete set of bin condition sensor data every 48 hours to the central monitoring system for capture and reporting purposes, or something along those lines. Such periodic reporting may be useful, for example, where a user wishes to access information on temperature fluctuations that fall short of the threshold level.

Optimizing Packet Contents:

As will be understood from the remainder of the narrative in this document there are a number of different approaches that can be taken to optimize the contents of communication packets from the transceiver of the present invention to the central monitoring site or location and system. Any optimize nation which can be done in terms of the contents and size of communications to be sent from the remote locations to the central monitoring site will result in decreased or optimized bandwidth usage in the communication between the remote sites and the central monitoring station and all of these different approaches to optimizing the content of these communication packets are contemplated within the scope hereof. The key to the method of the present invention is that the transceiver will only communicate with the central monitoring station when necessary, and will only send the necessary information when communicating.

The first means of optimizing the communications between the remote sites and the central monitoring location, as outlined in detail throughout, is the concept of only triggering a communication from the remote site transceiver to the central monitoring location when a notification condition in terms of the temperature or other condition change is detected. Prior art approaches in this area included the dispatch of communications on a periodic time frequency basis and, while those periodic communications would provide an electronic "heartbeat" of sorts in terms of the operability at the remote sites, the periodic communications which reported the temperature status of all of the bins at that location would consume unnecessary communications bandwidth annotation unnecessary communications costs insofar as the only time that notification is really required is when there is an unacceptable temperature or condition delta in the bin.

In terms of an electronic "heartbeat" to indicate or notify to the central monitoring station the operability of the transceiver and the remote site, it may still be desired to do this within the scope of the present invention and insofar as the system would by and large only location a detailed communication from a transceiver to the central monitoring station when a trigger event was detected, it is contemplated that a second layer of communications could be added into the programming such that in the case that no communication has otherwise been dispatched from a transceiver to its central monitoring station in a predetermined period of time, communications packet of some type simply indicating the operability, battery level or otherwise of the transceiver and that the site could be dispatched, such that if that type of a periodic communication was not received another type of a notification to the user could be generated indicating the potential of a problem with the equipment on-site. Even in the case however of a "heartbeat" packet being dispatch from time to time as may be required, the contents of that packet might only include the briefest of communication to indicate the good standing of the equipment and may not include a detailed listing of the temperature settings in the individual bins on-site, so as again to minimize the amount of communications bandwidth consumed in the dispatch of such a communication.

Referring now to FIGS. 4 through 7, further embodiments of the monitoring system 80 are shown. Similar to the embodiment of FIG. 2 described above, in each instance a plurality of agricultural assets 82 are monitored by respective condition sensors 84.

Various types of assets 82 can be monitored, for example treated seeds, grains, oilseeds, pulses, fertilizer including dry and liquid, fuel, oil, chemicals, equipment, residences, outbuildings, livestock, dairy, poultry, hogs and others.

Accordingly, the sensors 84 can be arranged to sense various conditions according to the assets being monitored such as carbon dioxide, humidity, moisture, pressure, level, temperature, imaging, insect detection, pest detection, theft detection, kernel size, GPS, protein quality, weather and others.

In the illustrated examples, all of the assets are associated with a common remote location of one user; however, multiple users may be interacting with the same central monitoring system 92 with each user being associated with their own remote location. Furthermore, each agricultural asset 82 is provided with its own controller 86, for example a transceiver with a memory storage and a processor: i) for storing sensed conditions by the condition sensors thereon, ii) for determining if sensed conditions meet prescribed notification criteria stored thereon, and iii) for relaying notification conditions to the central monitoring system 92 either directly or through an intermediate component when the criterion is met.

As in previous embodiments, the sensors are arranged to communicate with the controller 86 by various means including wired or wireless communications for aggregating data, for example Zigbee, 802.11, Ruby, Bluetooth, 802.16, WiMax, and others.

As described in previous embodiments, the controller 86 comprises a transceiver which communicates with the central monitoring station over a suitable network 90 which may take various forms including GSM, CDMA, HSDPA, HSUPA, LTE, Satellite, WiMax, and others.

In the example of FIG. 4, the network comprises a cellular network such that the transceiver comprises a cellular modem arranged to communicate through cellular network towers to the central monitoring station. Each cellular modem in the illustrated embodiment includes a unique serial number and unique phone number associated therewith.

Figure 6:
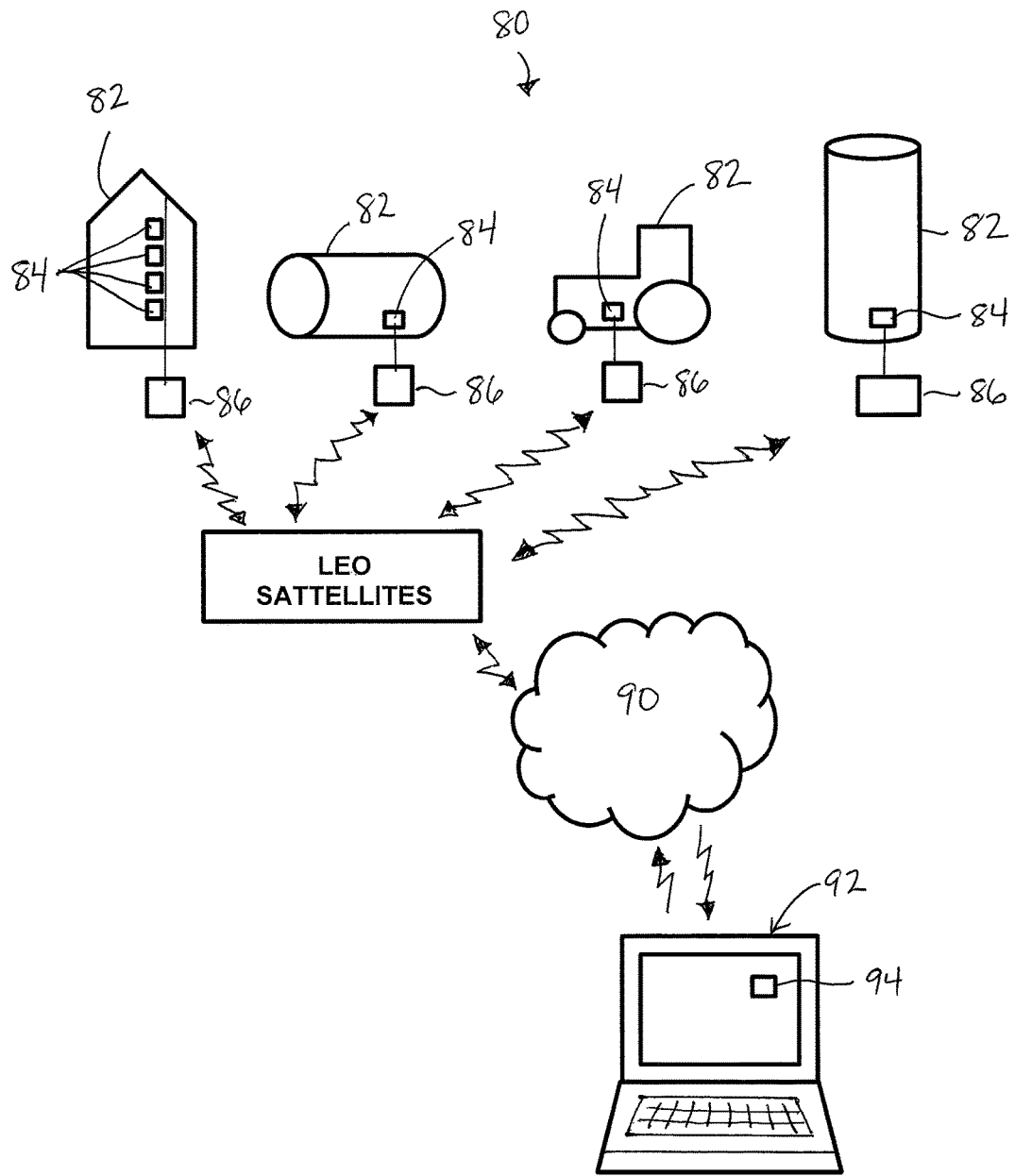
FIG. 6 is a diagrammatic illustration of a third system in accordance with the present invention.

Alternatively in the embodiment of FIG. 6, the communication network comprises low earth orbit satellites such that each transceiver comprises a satellite phone modem with a unique phone number and serial number.

In some instances, the assets may be further provided with a control mechanism which is operable to controllably vary the condition being monitored. For example, in the instance of an asset such as grain stored in a grain bin, the control mechanism may be a fan for aeration which when operated provides control over temperature or humidity. In this instance, when the central monitoring station 92 receives a notification signal, a corresponding instruction signal may be sent by the central monitoring system to the respective controller. The controller responds to the instruction by then activating the control mechanism, for example turning on the fan when a sensed temperature exceeds a respective threshold or other criterion. In this instance, the transceiver accordingly provides two-way communication between the central monitoring system and the sensors associated therewith.

The two way communication also allows the central monitoring system 92 to send software updates, instructions or other data to the controller. Accordingly, an instruction may comprise replacement notification criterion data such that the controller updates the prescribed notification criterion associated with one or more associated sensors in response to receipt of the data from the central monitoring system.

In operation, the monitoring system permits monitoring of numerous agricultural assets of one or more remote locations by providing at least one condition sensor in communication with each asset so as to be arranged to sense a respective asset condition of that asset together with a controller associated with each asset. The controller, which stores a prescribed notification criterion thereon which is associated with each sensor associated with the controller, communicates with the respective condition sensor. More particularly, each controller will periodically sample the respective asset condition of the asset associated therewith for comparing the asset condition to the prescribed notification criterion to determine a notification condition exists if the asset condition meets the criterion.

As in previous embodiments, each periodic sampling occurs at the expiry of the prescribed cycle duration from the end of the previous periodic sampling loop, and the prescribed cycle duration stored on the memory storage of the controller can be varied according to user preference by any suitable means. In the preferred embodiment, the prescribed cycle duration can be set through a user interface of the central monitoring server to be updated on the controller when received as an instruction signal from the central monitoring server.

A notification signal is transmitted by the controller to the central monitoring system in response to determination of a notification condition by any one of the sensors. Typically, the notification signal only comprises notification of a change in condition by at least one of the sensors together with only the sensed conditions which met the respective notification criteria.

Turning now to FIG. 4, in some instances some of the assets designated 82' may be associated with both a master unit 86A and a slave unit 86B. Either one of the master unit 86A or the slave unit 86B may include the features of the controller or transceiver 86 described above.

According to a first example of operation of the master and slave units 86A and 86B, the slave units 86B provide the function of the controller 86 by i) storing the notification criterion thereon, ii) executing the programming for periodically polling the respective sensors 84 for the sensed conditions thereof, iii) comparing the sampled conditions to the notification criterion stored thereon to determine if there is a notification condition, and iv) transmitting a notification signal to the master unit 86A only when a notification condition is determined. The master unit 86A in this instance only transmits to the central monitoring system over the network 90 upon receipt of a notification condition from one of the slave units.

According to a second example of operation of the master and slave units 86A and 86B, the slave units 86A report all sensed conditions to the master unit regardless of the notification criterion and the master unit 86A instead provides the function of the controller 86. Accordingly the master unit 86A in this instance: i) stores the notification criterion thereon, ii) executes the programming for periodically polling the sensed conditions from the slave units 86A which in turn retrieve the sensed conditions from the respective sensors, iii) compares the sampled conditions to the notification criterion stored thereon to determine if there is a notification condition, and iv) transmitting a notification signal from the master unit 86A over the network 90 to the central monitoring network only when a notification condition is determined.

Figure 5:
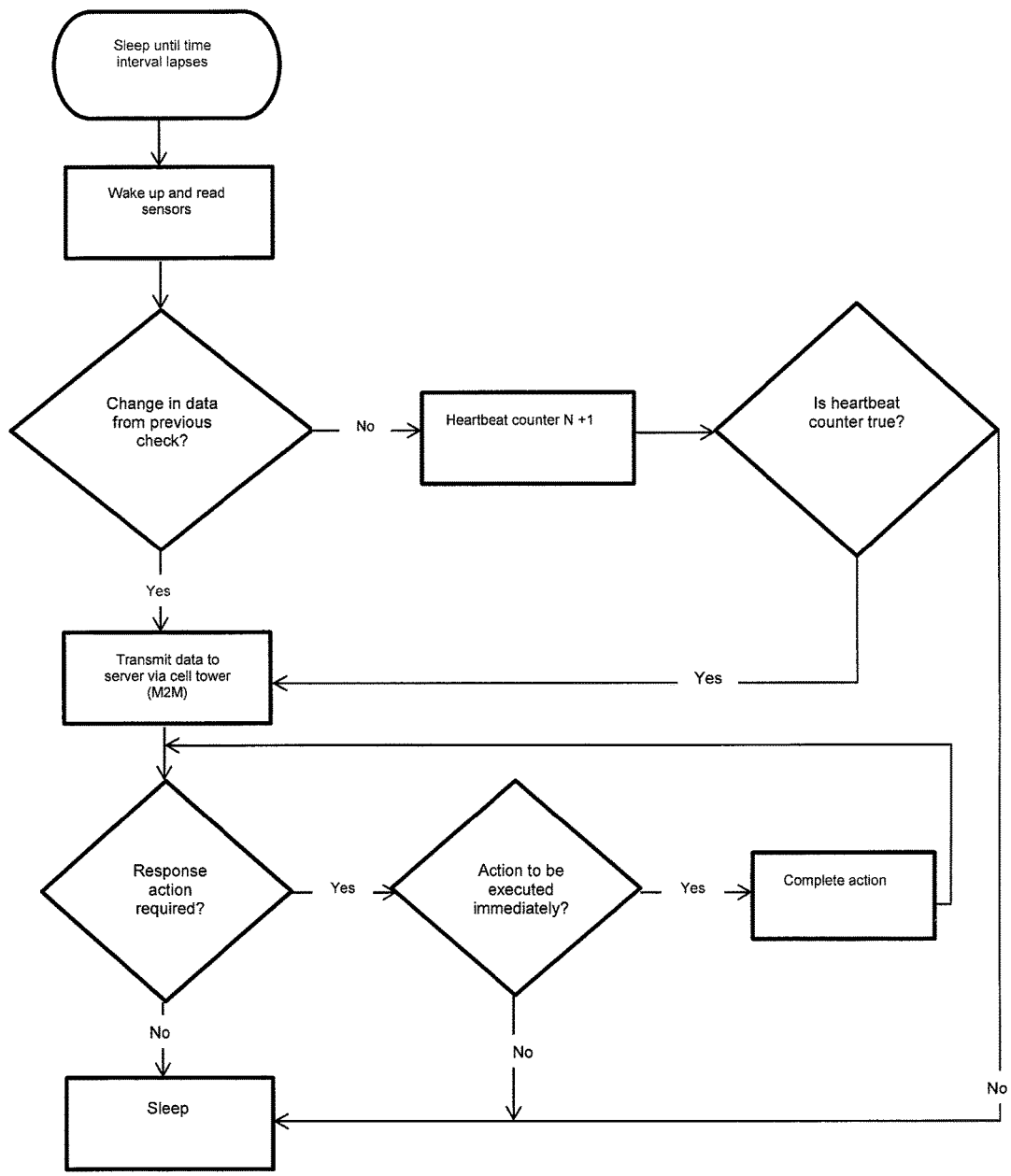
FIG. 5 is a flowchart illustrating an exemplary method in accordance with the system of FIG. 4.
Figure 7:
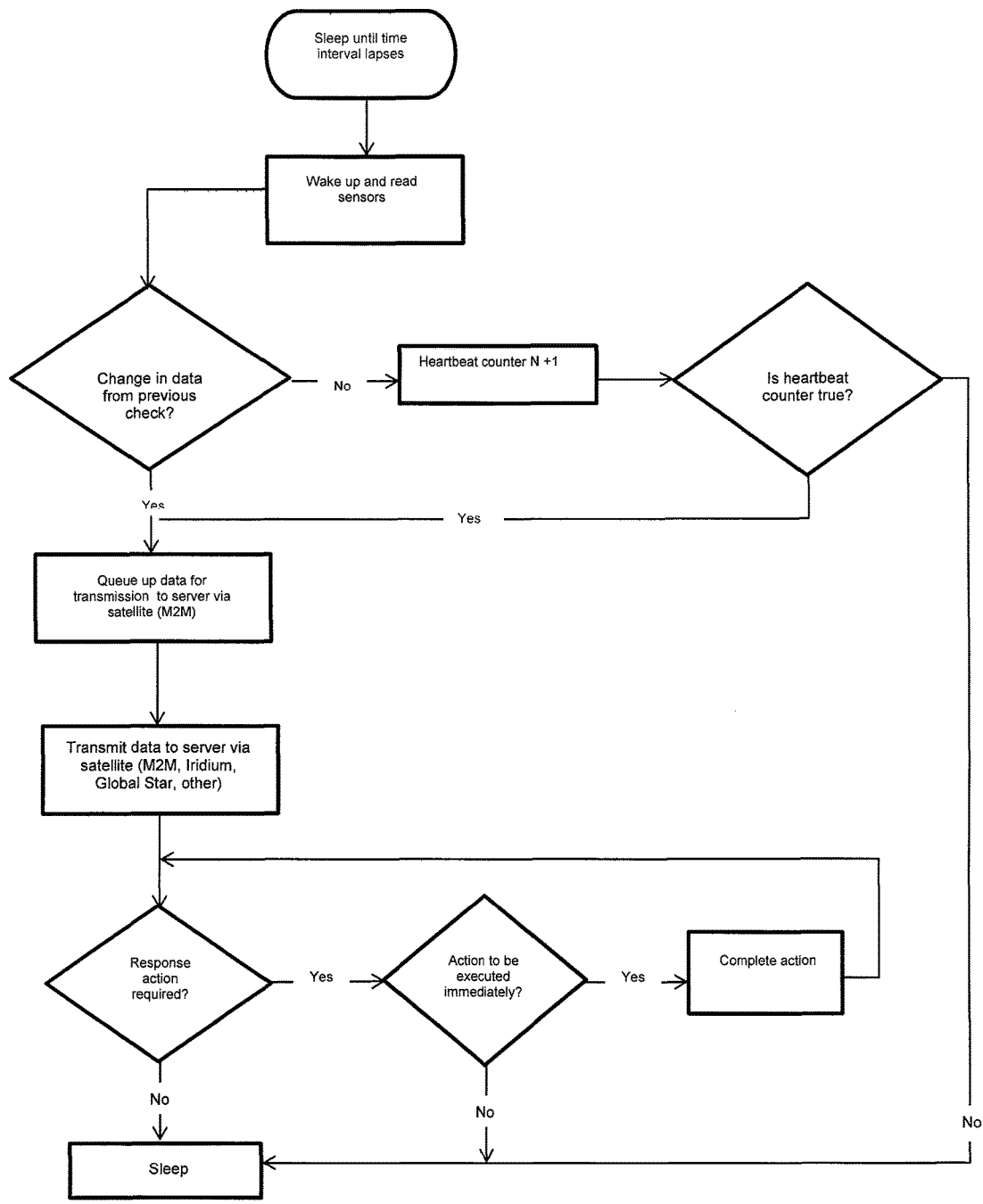
FIG. 7 is a flowchart illustrating an exemplary method in accordance with the system of FIG. 6.

Turning now to FIGS. 5 and 7, the controller operation is illustrated. As shown, the controller operates at regular, periodic prescribed intervals such that a complete cycle is performed at each periodic interval. Each cycle involves the controller initially waking up upon the period of time between cycles elapsing. The controller then reads or samples all of the condition sensors associated therewith and compares each sensed condition to the respective notification criterion associated with that sensor which is stored on the controller.

As described above in regard to previous embodiments, the criterion may comprise a comparison to a threshold, or may be a percent change of the value relative to prior data for example. If the criterion is met and a notification condition is determined, then transmission of the notification signal is arranged by the controller.

The central monitoring system assesses the notification signal upon receipt and also sends any corresponding instructions or data back to the controller such as software updates or instructions to operate associated control mechanisms. The controller determines if the action has been appropriately executed and then checks again if further instruction or data is received from the central monitoring system. If no further action is required, the cycle ends and the prescribed interval between cycles is again measured so that a new cycle begins upon the expiry of the prescribed interval.

If no notification condition has been determined, the cycle instead follows a heartbeat counting algorithm by adding a cycle count to a counter of the system. The number of cycles is then compared to a prescribed number of cycles stored on the controller. If a prescribed number of cycles with no notification condition has been met, then a notification signal is transmitted to the central monitoring system only to indicate that no notification conditions exist. When the prescribed number of cycles has been reached, the counter is reset to zero.

The embodiments of FIGS. 5 and 7 differ only in the manner of data transmission to the central monitoring system. In the example of FIG. 5, the communication network comprises a cellular telephone network such that the notification signal is transmitted immediately via a cell tower upon determination of a notification condition. Alternatively, in the embodiment of FIG. 7, when the network comprises a satellite network, data for transmission such as notification signals are instead queued up for transmission to the server via satellite when an appropriate transmission window has been reached.

The central monitoring system is associated with a central memory, for example a cloud based data storage. In this instance, all information communicated between the central monitoring system and the controllers associated with a particular user, for example notification systems, sensed conditions, and instruction signals are recorded on the central memory together with an identification of the associated agricultural asset and the associated user for subsequent access by the system or the user.

The central monitoring system may be a server based application including a web based user interface or an app accessible by various mobile devices and the like to permit a user to interact with the associated data of that user stored in the central memory of the system. The user interaction may also be available in the form of Software as a Service. In either instance, the user interface allows a history of all the relevant data associated with a user to be displayed to the user when the user meets the conditions of appropriate authentication protocols of the interface. The central monitoring system also communicates with the user by updating the user immediately of any notification or alert conditions via SMS, email, or others.

To optimize operation of the controller, the controller is typically provided with a communication protocol having a dynamic timeout duration. The timeout duration corresponds to the duration that the controller attempts to communicate with the central monitoring system before the controller discontinues the communication attempt if no connection is made. The communication protocol is arranged such that the prescribed timeout duration of the controller is increased to an increased duration relative to the previous communication attempt in response to each failed communication attempt. Once a successful communication is achieved, the prescribed timeout duration corresponding to the successful attempt is maintained for subsequent communication attempts until a subsequent failed communication attempt. In response to the subsequent failed communication attempt, the timeout duration is again increased. The communication protocol continues in this manner until a maximum timeout duration is reached. The maximum timeout duration is then used for subsequent communication attempts.

In the instance of wireless communication between the condition sensors and the controller, this communication is also optimized by transmitting the wireless signal with a dynamic signal strength. More particularly, communication is initially attempted between each sensor and the corresponding controller at a minimum signal strength corresponding to a minimum power consumption. If no successful communication can be made, the signal strength is increased in increments with a communication attempt being made at each increment until a successful communication. Once a successful communication has been made, the signal strength is maintained at the corresponding increased signal strength for all subsequent communications until another failed communication attempt between a condition sensor and the controller. In response to the subsequent failed communication attempt, the signal strength can again be increased in a similar manner.

Figure 8A:
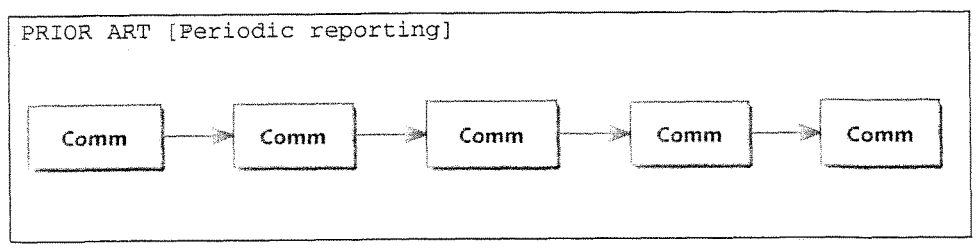
FIG. 8A is a schematic representation of a prior art condition reporting configuration.
Figure 8B:
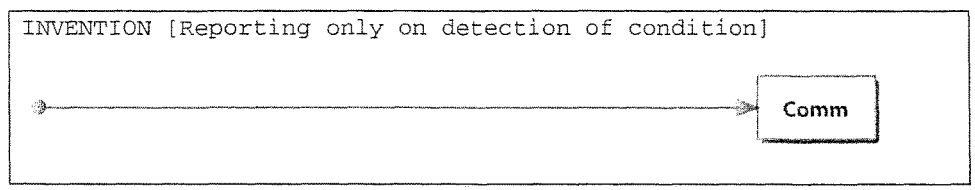
FIG. 8B is a schematic representation of the reporting of asset conditions according to the present invention.

Transmitting on Demand, Rather than Periodic:

FIGS. 8A and 8B demonstrate the decreased communications bandwidth which would be required in the dispatch of a communications packet from the transceiver only when a trigger event was detected, versus on a periodic basis. The first FIG. 8A demonstrates the periodic transmission approach, where a communication would be dispatched from a prior art transceiver every certain number of minutes for example. In the second FIG. 8B, a communication is shown as only being dispatched upon the detection of a trigger event, after four hours.

The significant decrease in communication requirements in the second approach outlined above, with the communication packet only being dispatched to the central monitoring system upon detection of a notification condition or a trigger event can be seen in this visible comparison.

Only Transmitting Exception Readings:

Another approach to optimizing the length and size of communications from the transceivers to the central monitoring station would be to in addition to only dispatching a detailed communication packet from the transceiver to the central monitoring location when a trigger event was detected, the data which could be sent from the transceiver to the central monitoring location when a trigger event was detected could be limited to providing the temperature reading or other sensed condition details for the particular bin in which a notifiable temperature or other condition change was detected, rather than at the time of dispatching a communication providing a temperature update with respect to all of the bins. This would limit the size of the communication insofar as the only information in this type of the communication packet would likely be the identification or address of the transceiver, the specific bin, and the temperature or condition reading for the specific bin, within which the temperature or other condition change has been detected.

The following sample data will be used to demonstrate this second approach to optimizing the length of a data transmission in the method of the present invention, at a remote monitoring site with a single transceiver and seven bins connected thereto. The condition sensor data, for sample purposes, would be as follows [with the third bin being the only bin with a detected heating condition to be reported]:

In a first conventional data transmission which identified and provided the condition readings from all of the storage bins at the remote site, the data packet might look something like the following—presented visibly for the purpose of outlining the relative size of a data transmission:

| Site: 101 | |
|---|---|
| Bin 1 | 30 C |
| Bin 2 | 29 C |
| Bin 3 | 41 C |
| Bin 4 | 28 C |
| Bin 5 | 30 C |
| Bin 6 | 30 C |
| Bin 7 | 29 C |

| TRANSMIT ALL BIN TEMPERATURES: | | | | | | | | | | | | | |
|---|---|---|---|---|---|---|---|---|---|---|---|---|---|
| 101 | 1 | 30 | 2 | 29 | 3 | 41 | 4 | 28 | 5 | 30 | 6 | 30 | 7 | 29 |

| TRANSMIT ONLY DETECTED TEMPERATURE OR OTHER CONDITION CHANGE: | | |
|---|---|---|
| 101 | 3 | 41 |

The actual appearance or contents of the transmission packet might include additional envelope information or the like but these two visual presentations are provided simply for the purpose of demonstrating the shorter length or burst that would be required where transmitting only a detected temperature or other condition change or exception on detection of a trigger event, rather than the transmission of all of the bin temperatures for bins connected to the transceiver.

Various other modifications or enhancements to the formatting or preparation of a communication packet from the transceiver to the central monitoring station incoming communication interface can be contemplated by those skilled in the art of wireless or electronic communication and all such modifications, which accomplish the goal of maximizing the effectiveness and efficiency of and/or minimizing the bandwidth consumption by, the dispatch of such communications between those components of the system of the present invention are contemplated within the scope thereof. This may even include the incorporation of various encryption or compression technologies on either the central monitoring and or the remote transceiver end and again those are contemplated within the scope of the method as well.

As can be readily seen, then, the method and system of the present invention present significant advantages over the prior art. For example, the present invention provides for customizable triggers and remote access, while enabling simpler and more focused on-site action to address adverse temperature conditions.

The use of selected and packetized data transmissions reduces the amount of bandwidth used, and optional periodic reporting can be spread over longer intervals.

Due to the efficiency of data transmission introduced herein the components installed at the remote site in each instance, including the sensors and the transceivers, can be powered by low cost readily available batteries, for example common AA batteries, together with solar cells for providing either direct power or for recharging the batteries. The efficient communication can result in batteries which may remain operational for up to 2 years for example.

The foregoing is considered as illustrative only of the principles of the invention. Thus, while certain aspects and embodiments of the invention have been described, these have been presented by way of example only and are not intended to limit the scope of the invention, which could for example extend beyond condition sensors to other types of sensors. Indeed, the invention described herein may be embodied in a variety of other forms without departing from the spirit of the invention, which invention is defined solely by the claims below.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for remotely monitoring one or more agricultural assets at a remote location, the method comprising:
    providing a monitoring system comprising i) a plurality of condition sensors in communication with the one or more agricultural assets such that each condition sensor is arranged to sense a respective asset condition of a respective agricultural asset, ii) a controller separate from and commonly associated with the plurality of condition sensors at the remote location which is arranged for receiving sensed conditions transmitted from the condition sensors, the controller including a memory storing previously sensed conditions and prescribed notification criteria comprising a threshold level associated with the plurality of condition sensors thereon and a transceiver, and iii) a central monitoring station located separately from the remote location and arranged for communication with the controller through the transceiver of the controller; and
    using the controller to periodically perform a sampling cycle comprising a sampling of each condition sensor of the respective asset condition of the agricultural asset sensed by the condition sensor;
    for each sampling cycle, using the controller to compare each sampled asset condition sensed by each condition sensor to at least one of the previously sensed conditions to determine if the threshold level of the prescribed notification criteria has been met for that condition sensor and determining a notification condition for that condition sensor if the sampled asset condition meets the threshold level of the prescribed notification criteria; and
    using the controller, subsequent to completion of the sampling cycle, to initiate transmitting a single notification signal to the central monitoring station associated with the sampling cycle only if the notification condition is determined corresponding to any one of the condition sensors sampled within the sampling cycle such that the single notification signal is the only notification signal transmitted to the central monitoring station for the respective sampling cycle, the single notification signal including an identification of each sensed condition which resulted in the determination of the notification condition for the respective condition sensor sampled within the respective sampling cycle.

2. The method according to claim 1 further comprising the transceiver being arranged to receive instructions from the central monitoring station.

3. The method according to claim 1 further comprising using the controller to receive an instruction signal from the central monitoring station and initiating an action in response to the instruction signal.

4. The method according to claim 1 further comprising using the controller to receive replacement notification criteria data from the central monitoring station and updating the prescribed notification criteria stored on the controller using the replacement notification criteria data.

5. The method according to claim 1 further comprising providing a control mechanism in proximity to the agricultural asset which is operable to controllably vary a condition of the agricultural asset, sending an instruction signal from the central monitoring station to the controller in response to the notification signal, and using the controller to actuate the control mechanism in response to the instruction signal.

6. The method according to claim 1 further comprising transmitting the sensed asset condition which met the prescribed notification criteria together with the notification signal.

7. The method according to claim 1 further comprising monitoring a plurality of agricultural assets at a common remote location by providing each agricultural asset with a respective condition sensor and a respective controller arranged to communicate with the central monitoring station independently of the other controllers.

8. The method according to claim 7 including associating each condition sensor with a respective prescribed notification criteria stored on the respective controller.

9. The method according to claim 7 further comprising transmitting only sensed asset conditions which meet the prescribed notification criteria together with the notification signal.

10. The method according to claim 1 wherein the plurality of condition sensors are arranged to record respective asset conditions in different data formats and the method includes providing the controller with a communication protocol arranged to communicate with the different data formats of the plurality of condition sensors.

11. The method according to claim 1 further comprising transmitting the notification signal comprising a sensed asset condition of each condition sensor upon reaching a prescribed number of periodic samples of the asset condition sensed by the plurality of condition sensors regardless of the prescribed notification criteria being met.

12. The method according to claim 1 further comprising providing a central memory and storing notification signals received by the central monitoring station in the central memory.

13. The method according to claim 1 further comprising providing the controller with a communication protocol having a prescribed timeout duration corresponding to a duration that the controller attempts to communicate with the central monitoring station before the controller discontinues the communication attempt if no connection is made, and increasing the prescribed timeout duration to an increased duration in response to a failed communication attempt.

14. The method according to claim 13 further comprising maintaining the prescribed timeout duration at the increased duration in subsequent communication attempts until a subsequent failed communication attempt.

15. The method according to claim 1 further comprising communicating sensed asset conditions to the controller using a wireless signal having a prescribed signal strength, and incrementally increasing the prescribed signal strength until the sensed asset conditions are successfully communicated to the controller.

16. The method according to claim 15 further comprising maintaining the prescribed signal strength at an increased strength in subsequent communications until a failed communication attempt between a condition sensor and the controller.

17. The method according to claim 1 wherein the threshold level comprises a delta of the sampled asset condition relative to the previously sensed condition.

18. The method according to claim 1 wherein the threshold level comprises a rate of change of the sampled asset condition relative to one or more previously sensed conditions.

19. The method according to claim 1 wherein the prescribed notification criteria further comprises a sampling limit and wherein the method further includes determining a notification condition if the sampled asset condition does not meet the threshold level for a prescribed number of periodic samples.

20. A monitoring system for remotely monitoring one or more agricultural assets at a remote location, the system comprising:
   a plurality of condition sensors arranged to communicate with the one or more agricultural assets so as to sense a respective asset condition of the respective agricultural asset;
   a central monitoring station located separately from the remote location; and
   a controller separate from and commonly associated with the plurality of condition sensors at the remote location and configured to receive a signal from each of the plurality of condition sensors indicating a sensed condition of the respective agricultural asset; the controller comprising a transceiver arranged to communicate over a communications network, a memory storage storing prescribed notification criteria thereon comprising a threshold level associated with each of the plurality of condition sensors and being further adapted to store previously sensed conditions thereon and a processor coupled to the memory storage to enable the controller to i) periodically perform a sampling cycle comprising a sampling of each condition sensor of the respective asset condition of the agricultural asset, ii) execute a comparison of each asset condition sensed by respective ones of the plurality of condition sensors to at least one of the previously sensed conditions to determine if the threshold level of the prescribed notification criteria has been met for the respective condition sensor and a determination of a notification condition for the respective condition sensor if the asset condition meets the threshold level of the prescribed notification criteria, and iii) initiate transmission of a single notification signal associated with the sampling cycle upon completion of the sampling cycle, through the communication network to the central monitoring station only if determination is made of the notification condition corresponding to any one of the condition sensors sampled within the sampling cycle such that the single notification signal is the only notification signal transmitted to the central monitoring station for the respective sampling cycle in which the single notification signal includes an identification of each sensed condition which resulted in the determination of the notification condition for the respective condition sensor sampled within the respective sampling cycle.

* * * * *